(12) United States Patent
Greener et al.

(10) Patent No.: US 8,882,327 B2
(45) Date of Patent: *Nov. 11, 2014

(54) COMPOSITE LIGHT GUIDE PLATE

(71) Applicant: SKC Haas Display Films Co., Ltd., Chungcheongnam-do (KR)

(72) Inventors: Jehuda Greener, Rochester, NY (US); Richard D. Bomba, Rochester, NY (US); Herong Lei, Webster, NY (US); Michael R. Landry, Wolcott, NY (US)

(73) Assignee: SKC Haas Display Films Co., Ltd. (KR)

( * ) Notice: Subject to any disclaimer, the term of this patent is extended or adjusted under 35 U.S.C. 154(b) by 61 days.

This patent is subject to a terminal disclaimer.

(21) Appl. No.: 13/631,840

(22) Filed: Sep. 28, 2012

(65) Prior Publication Data

US 2014/0092632 A1    Apr. 3, 2014

(51) Int. Cl.
*F21V 8/00* (2006.01)
*B29D 11/00* (2006.01)

(52) U.S. Cl.
CPC ........ *B29D 11/00663* (2013.01); *G02B 6/0065* (2013.01)
USPC ............................ 362/627; 362/615; 264/1.24

(58) Field of Classification Search
None
See application file for complete search history.

(56) References Cited

U.S. PATENT DOCUMENTS

| | | | |
|---|---|---|---|
| 2007/0103910 A1* | 5/2007 | Brickey et al. | 362/311 |
| 2011/0242847 A1 | 10/2011 | Greener et al. | |
| 2011/0242851 A1* | 10/2011 | Landry et al. | 362/628 |
| 2012/0051091 A1* | 3/2012 | Landry et al. | 362/619 |
| 2013/0279196 A1* | 10/2013 | Greener et al. | 362/613 |

* cited by examiner

*Primary Examiner* — Ashok Patel
(74) *Attorney, Agent, or Firm* — Cantor Colburn LLP

(57) ABSTRACT

The present invention provides a composite light guide plate having a thickness of more than about 1 mm, for use in LCD backlights or in general illumination devices. In the fabrication method of the present invention the extrusion roll molding process is combined with coating and lamination steps to enable a cost effective roll-to-roll or roll-to-sheet manufacture of the thick composite light guide plate wherein one or both principal surfaces of the light guide plate contain a pattern to enable extraction and redirection of light by the light guide plate from a light source or multiple light sources placed at one or multiple edges of the light guide plate. The composite light guide plate comprises a patterned film and a pre-cut sheet joined together by an adhesive layer. In order to attain good light extraction efficiency the adhesive layer and the two constituent layers of the light guide plate must be optically matched such that the refractive indices of any two of the three materials of the composite light guide plate can differ by no more than 0.01.

9 Claims, 5 Drawing Sheets

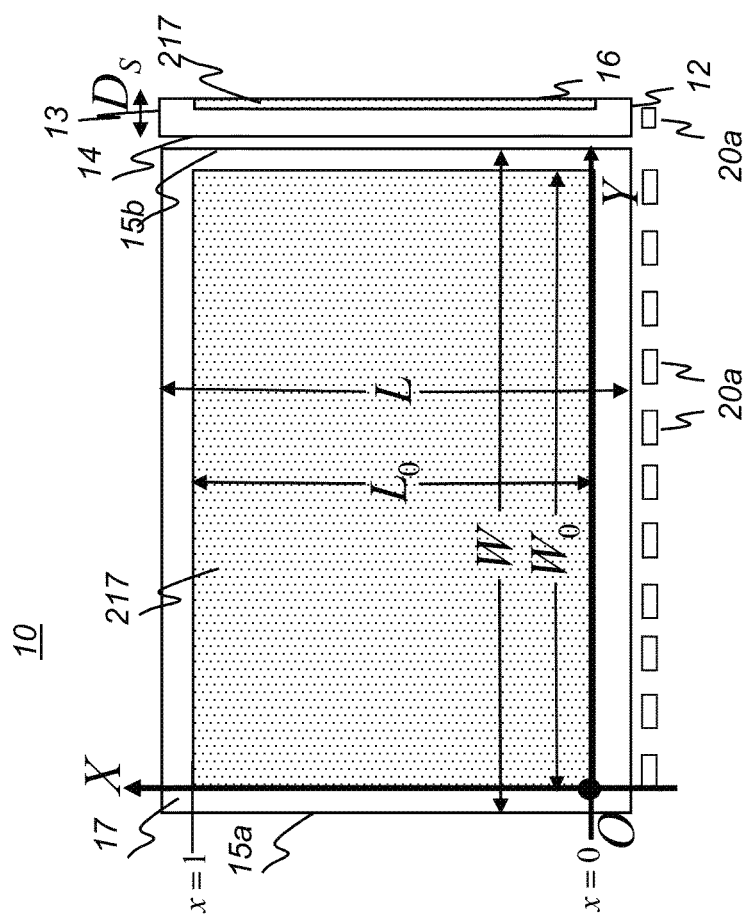

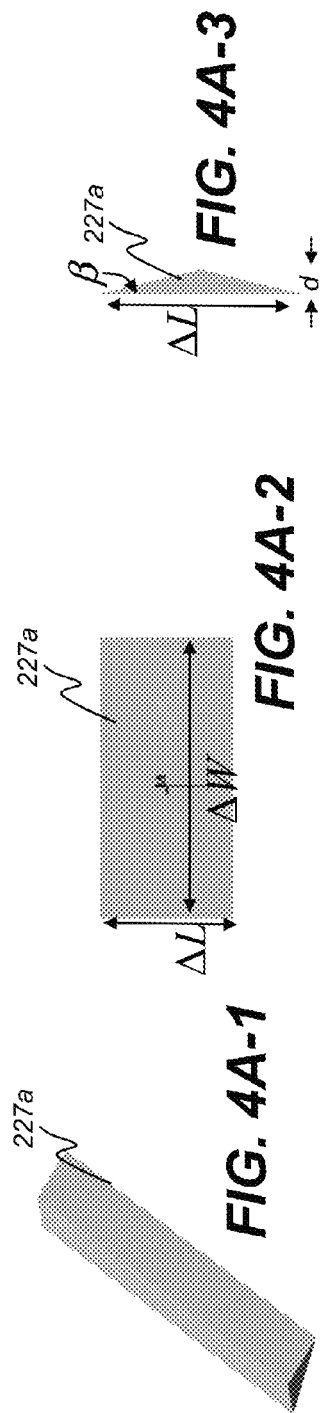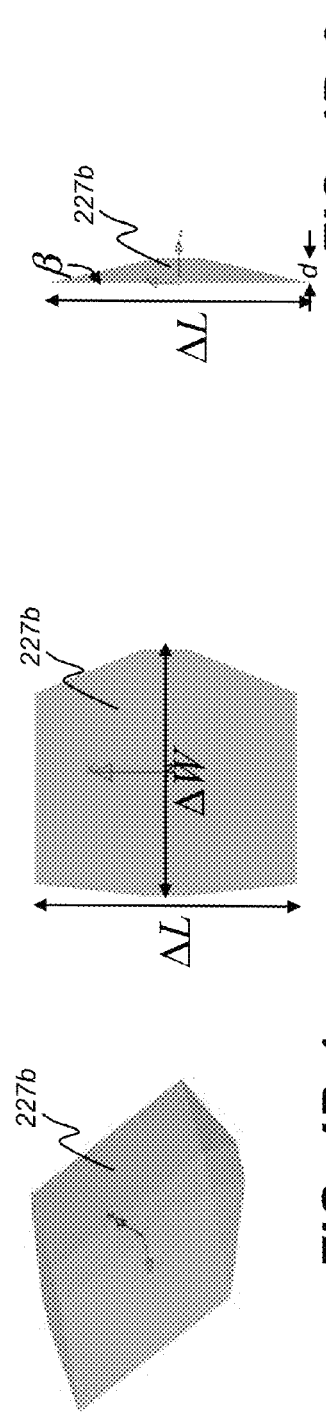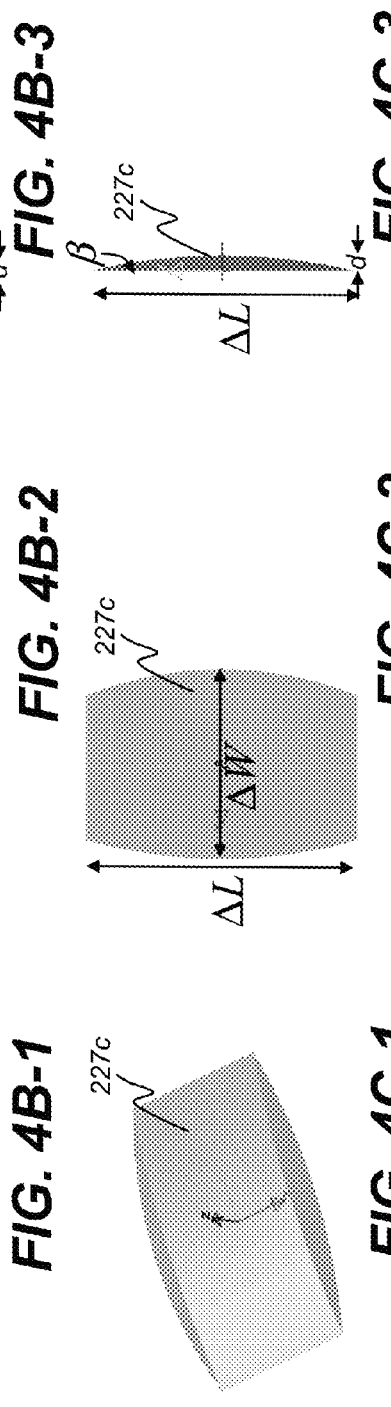

COMPOSITE LIGHT GUIDE PLATE

FIELD OF THE INVENTION

This invention generally relates to a light guide plate, and more particularly to a composite light guide plate and a process for making such.

BACKGROUND OF THE INVENTION

Liquid crystal displays (LCDs) continue to improve in cost and performance, becoming a preferred display technology for many computer, instrumentation and entertainment applications. Typical LCD mobile phones, notebooks, and monitors comprise a light guide plate for receiving light from a light source and redistributing the light more or less uniformly across the LCD. Existing light guide plates are typically between 0.8 mm and 2 mm in thickness. The light guide plate must be sufficiently thick in order to couple effectively with the light source, typically a cold cathode fluorescent lamp (CCFL) or a plurality of light emitting diodes (LEDs), and redirect more light toward the viewer. Also, it is generally difficult and costly to make light guide plates at a thickness smaller than about 0.8 mm and a width or length greater than about 60 mm using the conventional injection molding process. On the other hand, it is generally desired to slim down the light guide plate in order to lower the overall thickness and weight of the LCD, especially as LEDs are becoming smaller in size. Thus, a balance must be struck between these conflicting requirements in order to achieve optimal light utilization efficiency, low manufacturing cost, thinness, and brightness. However, in many LCD and general illumination lighting systems with relatively large dimensions (typically greater than 300 mm diag.) there is a need for relatively thick light guide plates with thickness typically greater than 2 mm. This high thickness is often dictated by dimensional and mechanical rigidity requirements as well as by the larger size of LEDs best suited for these larger lighting systems.

The extrusion roll molding process disclosed in U.S. Pat. Pub. No. 2011/0242847 provides an effective means for producing thin light guide plates in a roll-to-roll fashion and at relatively high line speeds. These extrusion casting processes become ineffective when the thickness of the patterned light guide plate exceeds about 1 mm. At this higher thickness range, replication fidelity for the light extraction micro-pattern becomes very poor under typical process conditions and line speeds are very slow. In order to extend the efficiencies of the extrusion roll molding process to relatively thick light guide plates and other types of thick micro-patterned optical films there is a clear need to modify this process in a way that eliminates some of the problems in attaining good replication fidelity for the desired micro-pattern while maintaining relatively high line speeds and good production efficiency.

The method of choice heretofore has been the injection molding process and some variants thereof. In this process a hot polymer melt is injected at high speed and pressure into a mold cavity having micro-machined surfaces with patterns that are transferred onto the surfaces of the solidified molded plate during the mold filling and cooling stages. Injection molding technology is quite effective when the lateral dimensions (width and/or length) are relatively small (≤about 300 mm). However, for relatively large light guide plates, the injection molding process requires very large molds and significant levels of injection pressure which typically leads to poor replication and high residual stress and birefringence in the molded plate, creating poor dimensional stability and low production yields. Also, injection molding is a batch process and therefore quite inefficient in high volume operations. Another approach used to produce thick light-guide plates is to print a discrete ('dot') micro-pattern on one side of a flat, extruded cast sheet using ink-jet, screen printing or other types of printing methods. This process is disadvantaged in that the extrusion casting step requires an additional costly printing step and the shape and dimensions of the discrete micro-extractors are predetermined and not well-controlled and, therefore, light extraction and redirection is inefficient.

While there have been solutions proposed for preparing various types of light guide plates using relatively fast extrusion casting, roll-to-roll operations, these operations are limited to relatively thin light guide plates. Thus, for applications requiring relatively thick light guide plates for both the LCD backlight and general illumination markets, there remains a need to prepare cost-effectively light guide plates with a thickness greater than about 1 mm using an efficient single pass extrusion casting process.

SUMMARY OF THE INVENTION

The present invention provides a composite light guide plate, comprising a patterned film and a pre-cut sheet joined together by an adhesive layer. The pattern on the surface of the patterned film, opposite the surface facing the pre-cut sheet, is designed to enable efficient extraction and redirection of light from a light source or multiple light sources placed at one or multiple edges of the light guide plate. To improve light extraction efficiency, the patterned film, pre-cut sheet and solidified adhesive layer must be optically matched such that the difference between any two of the three refractive indices, of the pre-cut sheet, the patterned film and the solid adhesive layer, is less than 0.01 and the indices should be preferably related as: $n_f \geq n_a \geq n_s$, where $n_f$, $n_a$ and $n_s$ are the refractive indices of the patterned film, adhesive layer and pre-cut sheet, respectively.

BRIEF DESCRIPTION OF THE DRAWINGS

FIGS. 2A and 2B show a bottom view and a side view, respectively, of a light guide plate;

FIGS. 4A-1, 4A-2, and 4A-3 show perspective, top, and side views of a first kind of discrete elements;

FIGS. 4B-1, 4B-2, and 4B-3 show perspective, top, and side views of a second kind of discrete elements;

FIGS. 4C-1, 4C-2, and 4C-3 show perspective, top, and side views of a third kind of discrete elements.

DETAILED DESCRIPTION OF THE INVENTION

Figure 1:
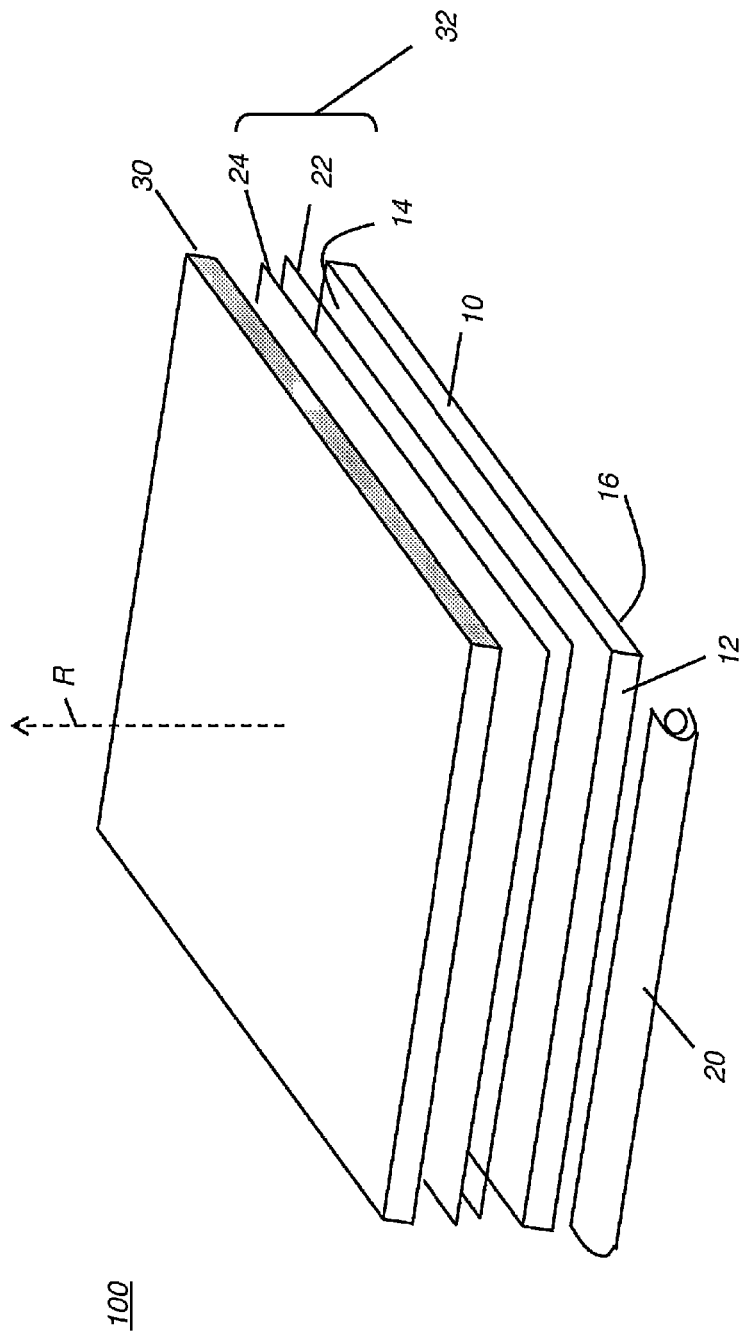
FIG. 1 is a schematic perspective view of an exemplary embodiment of a display apparatus using the composite light guide plate of the present invention.

Referring to FIG. 1 there is shown a display apparatus 100 that uses light guide plate 10 as part of a backlight assembly

32. Light from light source assembly 20 is coupled to light guide plate 10 through input surface 12. A display panel 30, such as an LCD panel, modulates light emitted from light output surface 14 of light guide plate 10 in the backlight assembly 32. One or more additional films, shown as films 22 and 24 in FIG. 1 may also be provided as part of the backlight assembly 32 for improving the direction, uniformity, or other characteristic of light emitted from the light guide plate 10 or to provide polarization to the light passing through the LCD panel 30. The path of light through the display panel is shown as dashed arrow R. Light extraction and redirection by the light guide plate 10 is facilitated by an array of discrete microscopic features disposed, typically but not exclusively, on its bottom surface 16 opposite the output surface 14. A light reflector is also commonly disposed under the light guide plate 10, adjacent to featured surface 16, to improve light extraction efficiency from the light source. The output surface 14 and bottom or featured surface 16 shall be referred to as the principal surfaces of the light guide plate.

Light guide plates or films in LCD backlights and general illumination devices have a general function of converting light emanating from a point light source, a plurality of point light sources such as light emitting diodes (LEDs) or a line light source such as a cold cathode fluorescent lamp (CCFL), into a planar or curved light emitting surface. It is desired that the light be efficiently extracted from the light source(s) and emitted from the output surface as uniformly as possible.

As shown in FIGS. 2A and 2B, light guide plate 10 has a light input surface 12 for coupling light emitted from light source 20a, an output surface 14 for emitting light out of the light guide plate, an end surface 13 which is opposite of the input surface 12, a bottom surface 16 opposite of the output surface 14, and two side surfaces 15a and 15b. Light source 20a can be a single linear light source such as CCFL, a point-like light source such as an LED or a plurality of point-like light sources, e.g., an LED array.

The light guide plate of the present invention uses light-extracting micro-structures shaped as discrete elements and placed on one principal surface thereon and, optionally, light-redirecting micro-structures that are generally shaped as continuous prisms and placed on the opposite principal surface of the light guide plate. True prisms have at least two planar faces. Because, however, one or more surfaces of the light-redirecting structures need not be planar in all embodiments, but may be curved or have multiple sections, the more general term "light redirecting structure" is used in this specification. Typically, but not exclusively, the light extracting micro-pattern 217 is placed on the bottom surface 16, while the light-redirecting structures, if present, are positioned on the output surface 14 of the light guide plate.

Light guide plate 10 has a micro-pattern 217 of discrete elements represented by dots on its bottom surface 16. The pattern 217 has a length $L_0$ and a width $W_0$, which are parallel and orthogonal, respectively, to the line of light sources 20a. Generally, the pattern 217 has a smaller dimension than light guide plate 10 in the length direction, in the width direction, or in both directions. Namely, $L_0 \leq L$ and $W_0 \leq W$. The size and number of discrete elements may vary along the length direction and the width direction. Alternatively, the pattern 217 can be on the output surface 14 of light guide plate 10.

Generally, the density of discrete elements $D^{2D}(x, y)$ varies with location (x, y). In practice, the density function $D^{2D}(x, y)$ varies strongly along the length direction while it varies weakly along the width direction. For simplicity, one dimensional density function D(x) is usually used to characterize a pattern of discrete elements and can be calculated, for example, as $D(x) = \int D^{2D}(x, y) dy \approx W_0 D^{2D}(x, 0)$. Other forms of one-dimensional (1D) density function can also be easily derived from the 2D density function $D^{2D}(x, y)$. In the following, the independent variable x should be interpreted as any one that can be used to calculate a one-dimensional density function D(x). For example, x can be the radius from the origin O if the light source is point-like and located near the corner of the light guide plate.

Figure 3A:
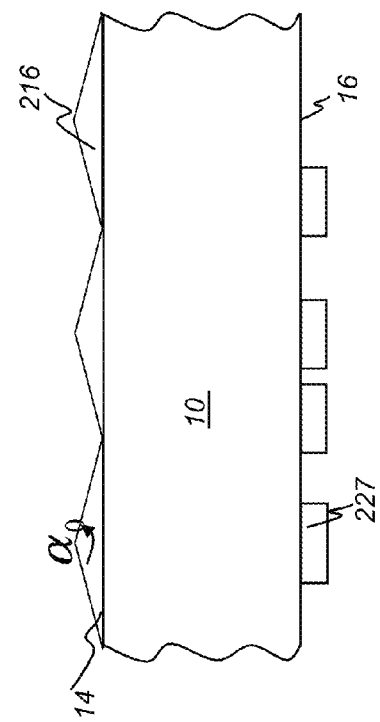
FIG. 3A shows an expanded side view of the light guide plate in a backlight unit viewed in a direction parallel to the width direction.
Figure 3B:
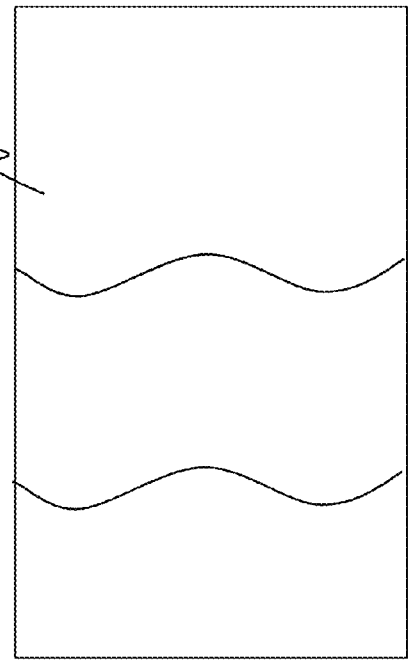
FIG. 3B shows an expanded side view of the light guide plate viewed in a direction parallel to the length direction.
Figure 3C:
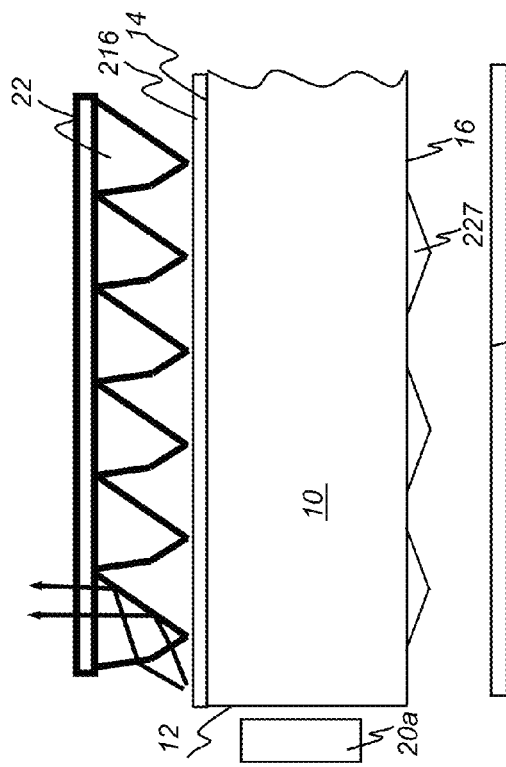
FIG. 3C is a top view of linear prisms on the light guide plate.
Figure 3D:
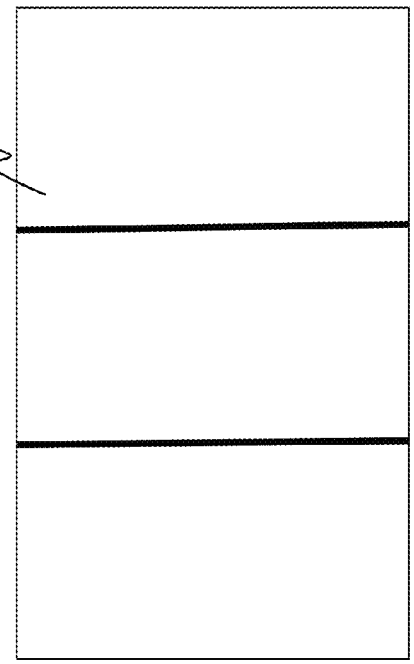
FIG. 3D is a top view of curved wave-like prisms on the light guide plate.

FIG. 3A shows an expanded side view of light guide plate 10, a prismatic film such as a turning film 22 or a diffuser, and a reflective film 142 when viewed in a direction parallel to the width direction. Optionally, on the output surface 14 of light guide plate 10 are a plurality of prisms 216, and on the bottom surface 16 are a plurality of discrete elements 227. FIG. 3B shows an expanded side view of light guide plate 10 when viewed along the length direction. Each prism 216 on the output surface 14 generally has an apex angle $\alpha_0$. The prism may have a rounded apex and may be substituted by a lenticular pattern. FIG. 3C is a top view of prisms 216. In this example, the prisms are parallel to each other. In another example, shown in FIG. 3D, the prisms 216 are curved or wave-like. Prisms or lenticular (rounded) elements with any known modification may be used in the present invention. Examples include, but are not limited to, prisms with variable height, variable apex angle, and variable pitches. Most commonly, however, the output surface of the light guide plate is flat and featureless.

FIGS. 4A-1, 4A-2, and 4A-3 show perspective, top, and side views, respectively, of one kind of discrete elements 227a that can be used according to the present invention. Each discrete element is essentially a triangular segmented prism. FIGS. 4B-1, 4B-2, and 4B-3 show perspective, top, and side views, respectively, of a second kind of discrete elements 227b that can be used according to the present invention. Each discrete element is essentially a triangular segmented prism with a flat top. FIGS. 4C-1, 4C-2, and 4C-3 show perspective, top, and side views, respectively, of a third kind of discrete elements 227c that can be used according to the present invention. Each discrete element is essentially a rounded segmented prism. Discrete elements of other known shapes such as cylinders, hemispheres and spherical sections can also be used. They may or may not be symmetrical.

There is no specific restriction on the thickness of the light guide plate 10, but it is generally dictated by the thickness requirements of the display system or illumination device, the size of the light source to be coupled to the light guide plate, and general rigidity and stiffness requirements for the lighting system. Generally, for small-size displays such as those used in mobile phones, tablets and notebook computers, the backlight must have relatively thin form factors, thus dictating thin (<1 mm) light guide plates. For larger displays, e.g., televisions, monitors and flat panel illumination fixtures and down lights, the light guide plates must be considerably thicker, typically >1 mm. For the thin light guide plates, general roll-to-roll, extrusion casting fabrication methods such as the extrusion roll molding process have been shown to work well and provide a low cost alternative to more established manufacturing methods such as injection molding and screen printing. For thicker light guide plates, with thickness >about 1 mm, the extrusion casting methods do not work well because of difficulties in replicating the light extraction micro-pattern, and difficulty in conveyance of thick sheets or slabs of relatively brittle materials such as poly(methyl methacrylate) (PMMA) through the extrusion casting system. In addition, line speeds for relatively thick sheets are very slow under typical melt extrusion conditions, thus diminishing the cost-effectiveness of the extrusion casting operation. The present invention discloses a fabrication method that allows extension of the extrusion roll molding process to the preparation of relatively thick light guide plates (>1 mm) while avoiding or minimizing some of the aforementioned difficulties with regard to replication fidelity, conveyance and line speed.

Fabrication

Figure 5:
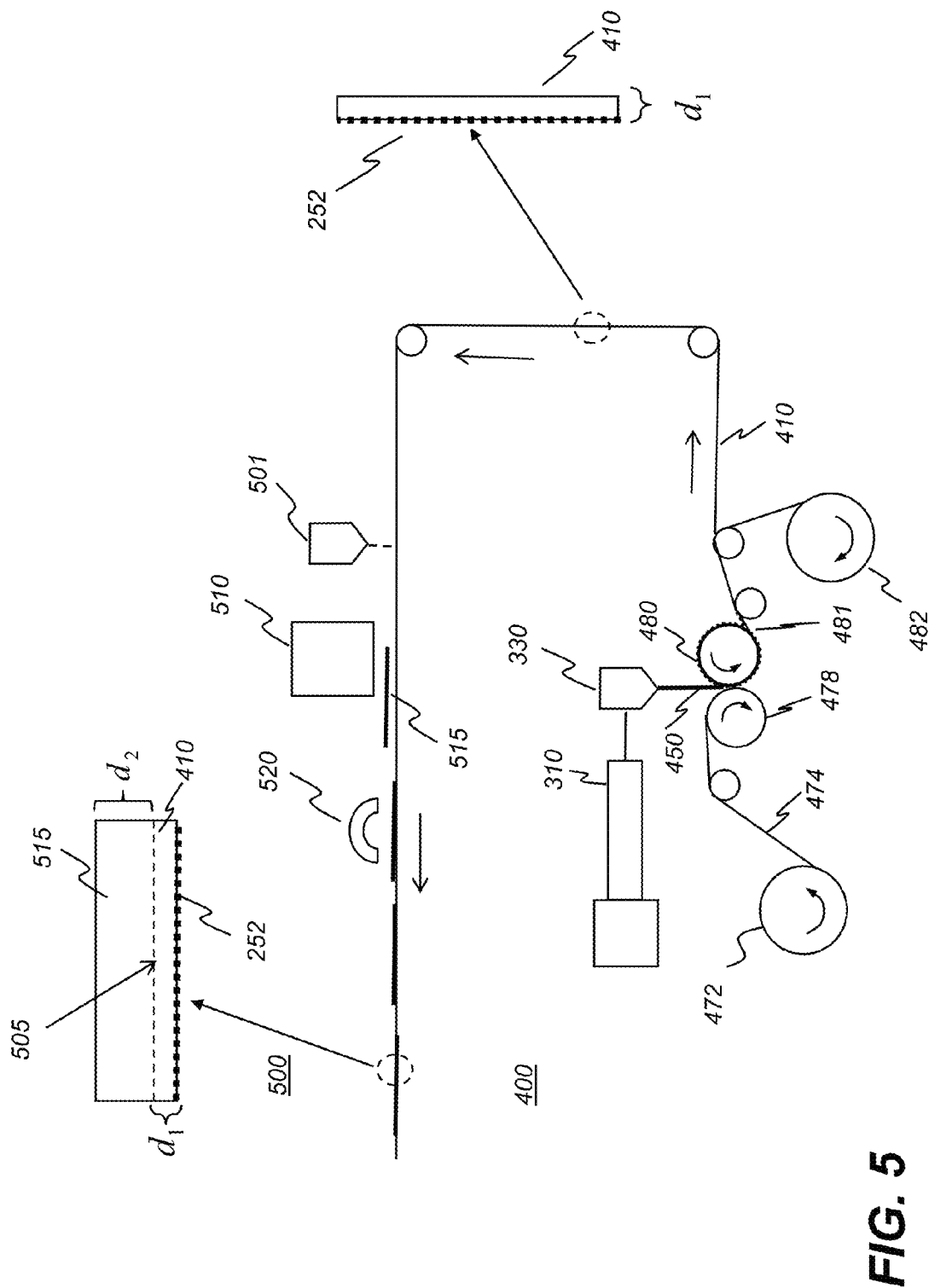
FIG. 5 is a schematic of one exemplary embodiment of a fabrication apparatus for forming the composite light guide plate of the present invention.

The present invention provides a composite light guide plate and a method for preparing the same. The method described herein is particularly suitable for web manufacturing and roll-to-roll operations and is readily adaptable to the manufacture of the composite light guide plates of the present invention. The fabrication process, illustrated schematically in FIG. 5, comprises the following steps:

1. Creating a molten sheet 450 of an optical polymer with the requisite optical and physical properties by extruding the resin from extruder 310 through sheeting die 330; casting the molten sheet onto a carrier film substrate 474, provided from a supply roller 472, and into the nip between a pressure roller 478 and a pattern roller 480, the pattern roller having an appropriate micro-pattern to be transferred to the surface of the cast sheet. The pressure roller and pattern roller are maintained at certain surface temperatures needed to achieve good replication of the features to be transferred from the pattern roller to the surface of the extruded sheet; The surface of roller 480 is maintained at an elevated temperature, $T_{PaR}$, such that $T_{PaR} > T_g - 50°$ C., where $T_g$ is the glass transition temperature of the extruded polymeric resin. Roller 478, the pressure roller, has commonly a soft elastomeric surface and a surface temperature $T_P$, where $T_P < T_{PaR}$. The nip pressure P between the two rollers is maintained such that P>8 Newtons per millimeter of roller width. Many types of carrier films can be used in the practice of the present invention but a common example of a carrier is poly(ethylene terephthalate) (PET) film which possesses a desirable combination of flexibility, stiffness, ruggedness and low cost. The use of a carrier film is optional in some cases, although controlling the quality of the manufactured film without the use of such a film would be generally more difficult. The carrier film 474 and the cast polymeric sheet 450 issuing from the nip region adhere preferentially to the pattern roller 480 forming a polymeric sheet with a desired thickness until solidifying some distance downstream from the nip.

2. The solidified patterned film 410 is stripped from pattern roller 480, at a stripping point 481, and then peeled from the carrier film 474; once separated from the patterned film, the carrier film is wound onto take-up roller 482, while the patterned film 410 is conveyed under controlled tension to a coating station 501. The thickness $d_1$ of the patterned film 410 is typically <1 mm and preferably <0.6 mm which is within the optimal range for the extrusion roll molding process. At this thickness, replication fidelity of the micro-pattern 217 and the conveyance and line speed of the film can be fully optimized.

3. Coating a thin layer 505 of a co-refractive adhesive onto the unpatterned surface of patterned film 410 at coating station 501. The thickness of the coated adhesive layer is not particularly restricted but is desirably <0.1 mm. The method of coating the thin adhesive layer is not specifically limited but may comprise various coating processes such as slot die, gravure, roll coating, blade coating or other coating processes suitable for depositing a relatively thin and uniform liquid layer onto the moving web. The refractive index and spectral characteristics of the adhesive material after curing and solidification must be closely matched to those of the solid patterned film such that the difference between the two refractive indices must be no more than 0.01.

4. Conveying the coated film through a sheet feeder 510 whereby pre-cut sheets or slabs 515, with a requisite thickness $d_2$ and specified dimensions, and comprising a material closely matched optically to the patterned film 410, are placed at a predetermined alignment onto the coated layer on the moving web. The refractive index of the sheet being closely matched to the refractive index of the patterned film and the solidified adhesion layer such that the difference between any two of the three refractive indices of the three layers being <0.01. In a preferred embodiment, the constituent materials of sheet 515 and film 410 are the same and the sheet 515 is blank, i.e., it is flat and unpatterned on either of its principal surfaces. The thickness $d_2$ of sheet 515 is not particularly restricted but it ranges typically from 0.5 to 10 mm depending on the final specified thickness of the light guide plate.

5. If, in one embodiment, the adhesive material is a UV curable resin, the laminated sheet 500 is conveyed through a UV curing station 520 wherein the adhesive layer is irradiated by UV light at a dosage sufficient for curing the adhesive layer; The UV curing station is optional and may be replaced with a thermal curing station if the coated adhesive is a thermal adhesive requiring high temperature to trigger the adhesion and curing functions. In another embodiment the adhesive layer is a pressure sensitive adhesive requiring the application of pressure between sheet 515 and pattern film 410 at station 520 through the use of pinch rollers or other methods of applying pressure on the moving web. In yet another embodiment, the joining of patterned film 401 to pre-cut sheet 515 is done by thermal bonding whereby the surfaces of both elements facing each other are heated to above the glass transition temperatures of the corresponding materials and are then pressed together by pinch rollers and the like to form a bond at the interface between the layers. This latter option does not require coating of an adhesive layer but the surfaces of the layers must be pre-heated before the joining step so the coating station 501 can be replaced with a pre-heat station.

6. The laminated web is conveyed to a finishing station for final cutting and finishing of the composite light guide plates. The thickness of the finished light guide plate 500 is: $d \sim (d_1 + d_2)$, assuming that the thickness of the adhesive layer 505 is negligibly small. In this composite light guide plate the adhesive layer is confined within the bulk of the light guide plate and is expected to be invisible to light traveling within the plate. By closely matching the optical properties, and especially the refractive indices, of the three material components of the laminated composite light guide plate following the aforementioned guidelines, scattering, waveguiding and absorption losses for light traveling within the light guide plate will be minimized, thus enhancing its light extraction efficiency. In a preferred embodiment the principal surfaces of the pre-cut sheet 515 are flat and unpatterned. In another embodiment the pre-cut sheet has redirecting features on the surface opposite the surface facing the adhesive layer. In this case proper alignment of the pre-cut sheet may be necessary during placement on the moving web.

Materials

The choice of polymeric materials for use in light guide plates for LCD backlights or general illumination devices is dictated by the demanding optical and physical performance requirements of the waveguide and the LCD. Generally, the material must possess very high optical transmittance, very low chromaticity, good environmental and dimensional stability and high abrasion resistance, among other requirements. In addition, the material must be melt-processable and relatively inexpensive in order to meet the cost requirements of this product class. These stringent requirements limit the choice of polymeric resins to very few material options. Two leading resin classes used today in LCD and general illumination light guide plates are poly(methyl methacrylate) (PMMA) and bis-phenol A polycarbonate (PC). Each of these materials has special strengths but each also suffers from a number of serious drawbacks. For example, while PMMA has excellent optical properties and very high abrasion resistance, it is very brittle and has borderline environmental stability. By comparison, PC has excellent mechanical properties and good environmental stability but its optical properties, especially light transmittance and color, are somewhat inferior to those of PMMA and its abrasion resistance is poor. Also, not all plastic materials can be reliably fabricated by melt extrusion operations. For example, PMMA would prove difficult to fabricate at a thickness below 0.3 mm because of high brittleness problems but should work well for relatively thick light guide plates.

Although PMMA and PC are particularly suitable for use in the light guide plate of the present invention, many other optically transparent materials may be used. The light guide plate of the present invention may be formed from any type of transparent polymers that are melt-processable. These materials include, but are not limited to, homopolymers, copolymers, and oligomers that can be further processed into polymers from the following families: polyesters; polyarylates; polycarbonates (e.g., polycarbonates containing moieties other than bisphenol A); polyamides; polyether-amides; polyamide-imides; polyimides (e.g., thermoplastic polyimides and polyacrylic imides); polyetherimides; cyclic olefin polymers; acrylic polymers such as PMMA and impact modified acrylic polymers, polyacrylates, polyacrylonitriles and polystyrenes; copolymers and blends of styrenics (e.g., styrene-butadiene copolymers, styrene-acrylonitrile copolymers, and acrylonitrile-butadiene-styrene terpolymers); polyethers (e.g., polyphenylene oxide, poly(dimethylphenylene oxide); cellulosics (e.g., ethyl cellulose, cellulose acetate, cellulose propionate, cellulose acetate butyrate, and cellulose nitrate); and sulfur-containing polymers (e.g., polyphenylene sulfide, polysulfones, polyarylsulfones, and polyethersulfones). Optically transmissive, miscible blends or alloys of two or more polymers or copolymers may also be used.

Suitably, under some embodiments, the light guide plate may comprise a melt-processable, flexible polymer. For the purpose of the present invention, a flexible polymer is a polymer that in a film or sheet form can be wound under a typical service temperature range around a cylinder 5 cm in diameter without fracturing. Desirably, the light guide plate may comprise polymeric materials having a combined effective light transmission of at least 85 percent (ASTM D-1003), more desirably at least 90 percent and a haze (ASTM D-1003) no greater than 2 percent, more desirably no greater than 1 percent. In general, suitable polymers may be crystalline, semi-crystalline, or amorphous in nature, but amorphous polymers are most suitable due to their ability to form optically homogeneous structures with minimal levels of haze. To best meet thermal dimensional stability requirements for display and general illumination applications the polymers in the light guide plate of the present invention should have a glass transition temperature (Tg) (ASTM D3418) of at least 85° C. and a thermal expansion coefficient (ASTM D-696) of no greater than $1.0 \times 10^{-4}$ mm/mm/° C. at ambient temperature.

Particularly suitable melt-processable polymers for the light guide plate of the present invention comprise amorphous polyesters (i.e., polyesters that do not spontaneously form crystalline morphologies under the time and temperatures employed during the extrusion process used to fabricate the light guide plates), polycarbonates (i.e., polycarbonates based on dihydric phenols such as bisphenol A), polymeric materials comprising both ester and carbonate moieties, and cyclic olefin polymers. In addition, normally brittle, melt-processable polymers such as poly(alkyl methacrylates), polystyrenes, and poly(acrylonitriles), are suitable materials for use in the present invention after being made flexible by the incorporation of impact modifier polymer particles (for example, impact modified PMMA that comprises soft core/hard shell latex particles), provided the impact modifier does not degrade the optical properties of the thick light guide plate to the point of not meeting the optical requirements of the light guide plate. Flexibility of the polymeric layer is desirable but not necessary for practicing this invention. Various types of nano-composites, comprising a matrix polymer blended with nano-particles whose dimensions are much smaller than the wavelength of visible light may also be used in one or all layers of the light guide plate, provided the optical properties of the light guide plate made therefrom, are not adversely impacted by the addition of nano-particles.

Suitable monomers and comonomers for use in polyesters may be of the diol or dicarboxylic acid or ester type. Dicarboxylic acid comonomers include, but are not limited to, terephthalic acid, isophthalic acid, phthalic acid, all isomeric naphthalenedicarboxylic acids, dibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornene and norborene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Other aliphatic, aromatic, cycloalkane or cycloalkene dicarboxylic acids may be used. Alternatively, esters of any of these dicarboxylic acid monomers, such as dimethyl terephthalate, may be used in place of or in combination with the dicarboxylic acids themselves.

Suitable diol comonomers include, but are not limited to, linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethylpropyl-3-hydroxy-2,2-d-i methyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols. Other aliphatic, aromatic, cycloalkyl and cycloalkenyl diols may be used.

The polymeric materials comprising both ester and carbonate moieties may be a (miscible) blend wherein at least one component is a polymer based on a polyester (either homopolymer or copolymer) and the other component is a polycarbonate (either homopolymer or copolymer). Such blends may be made by, for example, conventional melt processing techniques, wherein pellets of the polyester are mixed with pellets of the polycarbonate and subsequently melt blended in a single or twin screw extruder to form a homogeneous mixture. At the melt temperatures some transreaction (transesterification) may occur between the polyester and polycarbonate, the extent of which may be controlled by the addition of one or more stabilizers such as a phosphite compound. Alternatively, the polymeric materials comprising both ester and carbonate moieties may be a co(polyester carbonate) prepared by reacting a dihydric phenol, a carbonate precursor (such as phosgene), and a dicarboxylic acid, dicarboxylic acid ester, or dicarboxylic halide.

Cyclic olefin polymers are a fairly new class of polymeric materials that provide high glass transition temperatures, high light transmission, and low optical birefringence. Amorphous cyclic olefin polymers useful in the practice of the present invention include homopolymers and copolymers. The cyclic olefin (co)polymers include, for example, cyclic olefin addition copolymers of non-cyclic olefins such as α-olefins with cyclic olefins; cyclic olefin addition copolymers of ethylene, cyclic olefins and α-olefins; and homopolymers and copolymers prepared by ring opening polymerization of cyclic monomers followed by hydrogenation. Preferred cyclic olefin polymers are those composed of a cyclic olefin having a norbornene or tetracyclododecene structure. Typical examples of preferable cyclic olefin polymers and copolymers include, norbornene/ethylene copolymer, norbornene/propylene copolymer, tetracyclododocene/ethylene copolymer and tetracyclododocene/propylene copolymer. Current commercially available cyclic olefin polymers include, APEL™ (Mitsui Chemical Inc.), ARTON® (JSR Corporation), TOPAS® (Ticona GmbH), and Zeonex® and Zeonor® (Zeon Chemical Corporation). While the optical properties of this class of polymers are generally highly suitable for use in light guide plates, they are relatively high in cost and often quite brittle.

In a preferred embodiment, the materials used for making the patterned film 410, the adhesive layer and the pre-cut sheet 515 are the same or only slightly varied. In general, these materials must be closely matched optically to minimize scattering, waveguiding and absorption losses in the finished light guide plate but otherwise need not be the same. Optical matching requires that their refractive indices are nearly identical or differing by <0.01. Also, to minimize losses due to total internal reflection it is desired that the refractive indices of the three materials of the composite light guide plate are related as $n_f \geq n_a \geq n_s$ where $n_f$, $n_a$ and $n_s$ are the refractive indices of the patterned film, adhesive layer and pre-cut sheet, respectively. In addition, their spectral characteristics must be closely matched to minimize selective absorption by the different layers at different parts of the visible spectrum thus producing undesirable chromaticity effects. The composition and type of the adhesive layer is not particularly restricted as long as the optical properties of the solidified and cured adhesive are closely matched to those of the patterned film 410 and pre-cut sheet 515. It is especially important that the refractive index of the adhesive layer be closely matched, to within 0.01, of the indices of layers 410 and 515. The adhesive can be UV curable type, thermally curable type or pressure sensitive type. Many different adhesive materials are well known to the skilled artisan. Their choice should be dictated by their adhesive property and the need to match their optical properties with the two constituent layers of the composite light guide plate according to the aforementioned guidelines.

Thus, what is provided in the present invention is a composite light guide plate having a thickness greater than 1 mm for use in LCD backlights or in general illumination devices and an extrusion casting method for making such. In the fabrication process of the present invention, the extrusion roll molding process is combined with coating and lamination steps to enable a cost effective roll-to-roll or roll-to-sheet manufacture of thick light guide plates wherein one or both principal surfaces contain a pattern to enable extraction and redirection of light by the light guide plate from a light source or multiple light sources placed at one or multiple edges of the light guide plate. In order to attain good light extraction efficiency the optical properties of the adhesive layer and the two constituent layers of the light guide plate must be highly optically transmissive and optically matched such that the refractive indices of any two of the three materials of the composite light guide plate must differ by no more than 0.01 and the indices are preferably related as $n_f \geq n_a \geq n_s$ where $n_f$, $n_a$ and $n_s$ are the refractive indices of the patterned film, adhesive layer and pre-cut sheet, respectively.

The invention claimed is:

1. A composite light guide plate comprising: a patterned film and a pre-cut sheet joined together by an adhesive layer, with the patterned film having a patterned surface opposite the surface facing the pre-cut sheet and the pre-cut sheet having specified dimensions, and with the patterned film, pre-cut sheet and adhesive layer being optically matched such that the difference in refractive index between any two of the patterned film, pre-cut sheet and adhesive layer being no more than 0.01, wherein a spectral characteristic of the patterned film, a spectral characteristic of the pre-cut sheet and a spectral characteristic of the adhesive layer are closely matched to reduce selective absorption at different parts of the visible spectrum.

2. The light guide plate of claim 1 wherein the thickness of the pre-cut sheet is more than 0.5 mm.

3. The light guide plate of claim 1 wherein the pre-cut sheet is flat and unpatterned.

4. The light guide plate of claim 1 wherein the pre-cut sheet is patterned on a surface opposite the surface facing the adhesive layer.

5. The light guide plate of claim 1 wherein the patterned film, pre-cut sheet and adhesive layer comprise optically transmissive polymers including acrylic polymers, poly(methyl methacrylate), polycarbonates, polyesters, polycycloolefins, amorphous olefinic polymers, polyamides, polyimides, styrenics, polyurethanes, polysulfones, and copolymers or blends thereof.

6. The light guide plate of claim 1 wherein the patterned film comprises a same polymer as the pre-cut sheet.

7. The light guide plate of claim 1 wherein the refractive indices of the patterned film, adhesive layer and pre-cut sheet are related as $n_f \geq n_a \geq n_s$, where $n_f$, $n_a$ and $n_s$ are the refractive indices of the patterned film, adhesive layer and pre-cut sheet, respectively.

8. A composite light guide plate comprising: a thermally bonded patterned film and a pre-cut sheet, with the patterned film having a patterned surface opposite the surface facing the pre-cut sheet and the pre-cut sheet having specified dimensions, and with the patterned film and the pre-cut sheet being optically matched such that the difference in refractive index between any two of the patterned film, pre-cut sheet and adhesive layer being no more than 0.01, wherein a spectral characteristic of the patterned film, a spectral characteristic of the pre-cut sheet and a spectral characteristic of the adhesive layer are closely matched to reduce selective absorption at different parts of the visible spectrum.

9. The light guide plate of claim 8 wherein the refractive indices of the corresponding layers are related as $n_f \geq n_s$, where $n_f$ and $n_s$ are the refractive indices of the patterned film and pre-cut sheet, respectively.

\* \* \* \* \*